United States Patent
Smith et al.

(10) Patent No.: US 7,769,983 B2
(45) Date of Patent: Aug. 3, 2010

(54) CACHING INSTRUCTIONS FOR A MULTIPLE-STATE PROCESSOR

(75) Inventors: Rodney Wayne Smith, Raleigh, NC (US); Brian Michael Stempel, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 11/132,748

(22) Filed: May 18, 2005

(65) Prior Publication Data

US 2006/0265573 A1   Nov. 23, 2006

(51) Int. Cl.
*G06F 9/00* (2006.01)

(52) U.S. Cl. .......................................... 712/213; 710/14

(58) Field of Classification Search .................. 712/35, 712/203, 204, 205, 213, 207, 209, 43, 227, 712/210; 711/125; 713/1
See application file for complete search history.

(56) References Cited

U.S. PATENT DOCUMENTS

| | | | |
|---|---|---|---|
| 5,335,331 A | | 8/1994 | Murao et al. |
| 5,638,525 A | * | 6/1997 | Hammond et al. .......... 712/209 |
| 5,819,056 A | | 10/1998 | Favor |
| 5,822,559 A | | 10/1998 | Narayan et al. |
| 6,002,876 A | * | 12/1999 | Davis et al. .................. 717/162 |
| 6,021,265 A | * | 2/2000 | Nevill ......................... 712/209 |
| 6,081,884 A | * | 6/2000 | Miller ......................... 712/204 |
| 6,356,997 B1 | | 3/2002 | Krishnan et al. |
| 6,374,348 B1 | | 4/2002 | Irie et al. |
| 6,430,674 B1 | * | 8/2002 | Trivedi et al. ................. 712/43 |
| 6,438,700 B1 | * | 8/2002 | Adusumilli ................. 713/323 |
| 6,654,871 B1 | * | 11/2003 | Aidan et al. ................. 712/202 |
| 6,654,873 B2 | | 11/2003 | Kadowaki |
| 6,816,962 B2 | | 11/2004 | Augsburg et al. |
| 6,907,515 B2 | * | 6/2005 | Seal et al. .................... 712/209 |
| 6,910,206 B1 | * | 6/2005 | Nevill ......................... 717/153 |
| 6,952,754 B2 | * | 10/2005 | O'Connor et al. ........... 711/125 |

(Continued)

FOREIGN PATENT DOCUMENTS

EP    0 411 747 A2    2/1991

(Continued)

OTHER PUBLICATIONS

International Search Report—PCT/US06/019788, International Search Authority—European Patent Office—Feb. 14, 2007.

(Continued)

*Primary Examiner*—Henry W. H. Tsai
*Assistant Examiner*—Cheng-Yuan Tseng
(74) *Attorney, Agent, or Firm*—Peter M. Kamarchik; Nicholas J. Pauley; Sam Talpalatsky (57) ABSTRACT

A method and apparatus for caching instructions for a processor having multiple operating states. At least two of the operating states of the processor supporting different instruction sets. A block of instructions may be retrieved from memory while the processor is operating in one of the states. The instructions may be pre-decoded in accordance with said one of the states and loaded into cache. The processor, or another entity, may be used to determine whether the current state of the processor is the same as said one of the states used to pre-decode the instructions when one of the pre-decoded instructions in the cache is needed by the processor.

23 Claims, 5 Drawing Sheets

U.S. PATENT DOCUMENTS

| | | | |
|---|---|---|---|
| 6,965,984 B2 * | 11/2005 | Seal et al. | 712/209 |
| 6,978,358 B2 * | 12/2005 | Francis | 712/202 |
| 7,003,652 B2 * | 2/2006 | Nevill et al. | 712/244 |
| 7,017,030 B2 * | 3/2006 | Oldfield et al. | 712/207 |
| 7,080,242 B2 * | 7/2006 | Morris | 713/1 |
| 7,093,108 B2 | 8/2006 | Swaine | |
| 7,120,779 B2 * | 10/2006 | Seal | 711/220 |
| 7,134,003 B2 * | 11/2006 | Watt | 712/229 |
| 7,234,043 B2 * | 6/2007 | Blasco Allue et al. | 712/226 |
| 7,353,363 B2 | 4/2008 | Chaudhry et al. | |
| 7,356,673 B2 * | 4/2008 | Altman et al. | 712/43 |
| 7,360,060 B2 | 4/2008 | Chauvel et al. | |
| 7,406,585 B2 * | 7/2008 | Rose et al. | 712/205 |
| 7,421,568 B2 | 9/2008 | Stempel et al. | |
| 7,493,479 B2 * | 2/2009 | Kabasawa et al. | 712/233 |
| 2002/0004897 A1 * | 1/2002 | Kao et al. | 712/227 |
| 2002/0083301 A1 | 6/2002 | Jourdan et al. | |
| 2002/0083302 A1 * | 6/2002 | Nevill et al. | 712/209 |
| 2004/0024990 A1 * | 2/2004 | Chauvel et al. | 712/209 |
| 2004/0133764 A1 * | 7/2004 | O'Connor et al. | 712/43 |
| 2005/0262329 A1 * | 11/2005 | Krishnan et al. | 712/210 |
| 2006/0125219 A1 | 6/2006 | Kokeguchi et al. | |
| 2006/0149927 A1 * | 7/2006 | Dagan et al. | 712/43 |
| 2006/0265573 A1 * | 11/2006 | Smith et al. | 712/213 |
| 2007/0260854 A1 | 11/2007 | Smith et al. | |
| 2008/0229069 A1 | 9/2008 | Sartorius et al. | |
| 2009/0249033 A1 * | 10/2009 | Greenhalgh et al. | 712/205 |

FOREIGN PATENT DOCUMENTS

| | | |
|---|---|---|
| WO | 2006125219 | 11/2006 |

OTHER PUBLICATIONS

Written Opinion—PCT/US06/019788, International Search Authority—European Patent Office—Feb. 14, 2007.

* cited by examiner

CACHING INSTRUCTIONS FOR A MULTIPLE-STATE PROCESSOR

BACKGROUND

1. Field

The present disclosure relates generally to processing systems, and more specifically, to caching instructions for a multiple-state processor.

2. Background

Computers typically employ a processor supported by memory. Memory is a storage medium that holds the programs and data needed by the processor to perform its functions. Recently, with the advent of more powerful software programs, the demands on memory have been increasing at an astounding rate. The result is that modern processors require a large amount of memory, which is inherently slower than the smaller memories. Large memories with speeds capable of supporting today's processors are simply too expensive for large scale commercial applications.

Computer designers have addressed this problem by organizing memory into several hierarchal components. The largest component, in terms of capacity, is commonly a hard drive. The hard drive provides large quantities of inexpensive permanent storage. The basic input/output system (BIOS) and the operating system are just a few examples of programs that are typically stored on the hard drive. These programs may be loaded into Random Access Memory (RAM) when the computer is operational. Software applications that are launched by a user may also be loaded into RAM from the hard drive. RAM is a temporary storage area that allows the processor to access the information more readily.

The computer's RAM is still not fast enough to keep up with the processor. This means that processors may have to wait for program instructions and data to be written to and read from the RAM. Caches are used to increase the speed of memory access by making the information most often used by the processor readily available. This is accomplished by integrating a small amount of memory, known as a primary or Level 1 (L1) cache, into the processor. A secondary or Level 2 (L2) cache between the RAM and L1 cache may also be used in some computer applications.

The speed of the computer may be further improved by partially decoding the instructions prior to being placed into the cache. This process is often referred to as "pre-decoding," and entails generating some "pre-decode information" that can be stored along with the instruction in the cache. The pre-decode information indicates some basic aspects of the instruction such as whether the instruction is an arithmetic or storage instruction, whether the instruction is a branch instruction, whether the instruction will make a memory reference, or any other information that may be used by the processor to reduce the complexity of the decode logic. Pre-decoding instructions improves processor performance by reducing the length of the machine's pipeline without reducing the frequency at which it operates.

Processors capable of operating in multiple states are becoming commonplace with today's emerging technology. A "multiple state processor" means a processor that can support two or more different instruction sets. The ARM (Advance RISC Machine) processor, as sold by ARM limited, is just one example. The ARM processor is an efficient, low-power RISC processor that is commonly used today in mobile applications such as mobile telephones, personal digital assistants (PDA), digital camera, and game consoles, just to name a few. ARM processors have historically supported two instruction sets: the ARM instruction set, in which all instructions are 32-bits long, and the Thumb instruction set, which compresses the most commonly used instructions into a 16-bit format. A third instruction set that has recently been added to some ARM processors is "THUMB-2 Execution Environment" (T2EE). T2EE is an instruction set (similar to THUMB) that is optimized as a dynamic (JIT) compilation target for bytecode languages, such as Java and NET.

These multiple-state processors have significantly increased the capability of modern day computing systems, but can pose unique challenges to the computer designer. By way of example, if a block of instructions the size of one line in the L1 instruction cache contains instructions from multiple instruction sets, pre-decode information calculated assuming that the entire cache line contains instructions in one state cannot be used for those instructions that are actually in the other state. The solution described in this disclosure is not limited to ARM processors with THUMB and/or T2EE capability, but may be applied to any system that pre-decodes instructions for multiple instruction sets with overlapping instruction encodings prior to placing them into cache.

SUMMARY

One aspect of the present invention is directed to a method of operating a processor. The processor is capable of operating in different states, with each state supporting a different instruction set. The method includes retrieving a block of instructions from memory while the processor is operating in one of the states, pre-decoding the instructions in accordance with said one of the states, loading the pre-decoded instructions into cache, and determining whether the current state of the processor is the same as said one of the states used to pre-decode the instructions when one of the pre-decoded instructions in the cache is needed by the processor.

Another aspect of the present invention is directed to a processing system. The processing system includes memory, cache, a processor capable of operating in different states, each of the states supporting a different instruction set, the processor being further configured to retrieve a block of instructions from the memory while operating in one of the states, and a pre-decoder configured to pre-decode the instructions retrieved from the memory in accordance with said one of the states, wherein the processor is further configured to load the pre-decoded instructions into the cache, and, when one of the pre-decoded instructions in the cache is needed by the processor, determine whether its current state is the same as said one of the states used to pre-decode the instructions.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
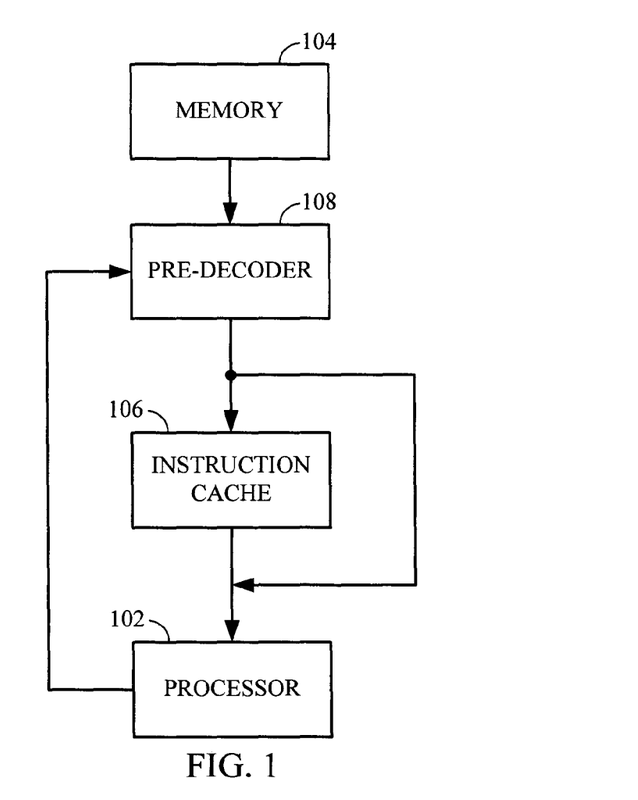
FIG. 1 is a functional block diagram illustrating an example of a processing system.

FIG. 1 is a conceptual block diagram illustrating an example of a computer 100, or other processing system, capable of processing, retrieving and storing information. The computer 100 may be a stand-alone component, or alternatively, embedded in a device such as a mobile telephone, PDA, digital camera, game console, or any other suitable device. The computer 100 may include a processor 102, such as a microprocessor or other processing entity. In one embodiment of the computer 100, the processor 102 is a 32-bit embedded RISC microprocessor commonly referred to in the industry as an ARM processor. The ARM processor is commonly used as a platform to run complex operating systems for wireless, consumer, imaging, automotive, industrial and networking applications. Included in many ARM processors is a THUMB instruction set which compresses most of the commonly used 32-bit ARM instructions into 16-bit forms. ARM has added 32-bit instructions to THUMB as well. The THUMB instruction set is shorthand for a subset of the 32-bit ARM instructions that can be used when code density is required. As indicated in the background portion of this disclosure, the ARM processor may also execute. T2EE.

The computer 100 may also include memory 104, which holds the program instructions and data needed by the processor 102 to perform its functions. The memory 104 may be implemented with RAM or other suitable memory, and may be comprised of the computer's main memory and optionally a L2 cache. An instruction cache 106 may be used between the processor 102 and the memory 104. The instruction cache 106 is a relatively small, high-speed L1 cache used for the temporary storage of program instructions from the memory 104 to be executed by the processor 102. In one embodiment of the computer 100, the instruction cache 106 is a high-speed static RAM (SRAM) instead of the slower and cheaper dynamic RAM (DRAM) that may be used for the memory 104. The instruction cache 106 provides a mechanism for increasing processor access speed because most programs repeatedly access the same instructions. By keeping as much of this information as possible in the instruction cache 106, the processor 102 avoids having to access the slower memory 104. The computer 100 may also include a data cache (not shown) for the storage of data used in the execution of the instructions.

The instruction cache 106 provides storage for the most recently accessed instructions by the processor 102 from the memory 104. When the processor 102 needs instructions from the memory 104, it first checks the instruction cache 106 to see if the instruction is there. When an instruction required by the processor 102 is found in the instruction cache 106, the lookup is called a "cache hit." On a cache hit, the instruction may be retrieved directly from the instruction cache 106, thus drastically increasing the rate at which instructions may be processed. An instruction required by the processor 102 that is not found in the instruction cache 106 results in a "cache miss." On a cache miss, the processor 102 must fetch the required instruction from the memory 104, which takes considerably longer than fetching an instruction from the instruction cache 106. Usually the processor 102 fetches a "cache line" from memory 104. The cache line from the memory 104 may be stored in the instruction cache 106 for future access.

Computer performance may be further enhanced by pre-decoding the instructions from the memory 104 prior to being placed in the instruction cache 106. A pre-decoder 108 takes the instructions as they are fetched from the memory 104, pre-decodes them in accordance with the operating state of the processor 102, and stores the pre-decode information in the instruction cache 106. Signaling from the processor 102 may be used to indicate the current operating state of the processor 102 for the pre-decoding operation.

Figure 2:
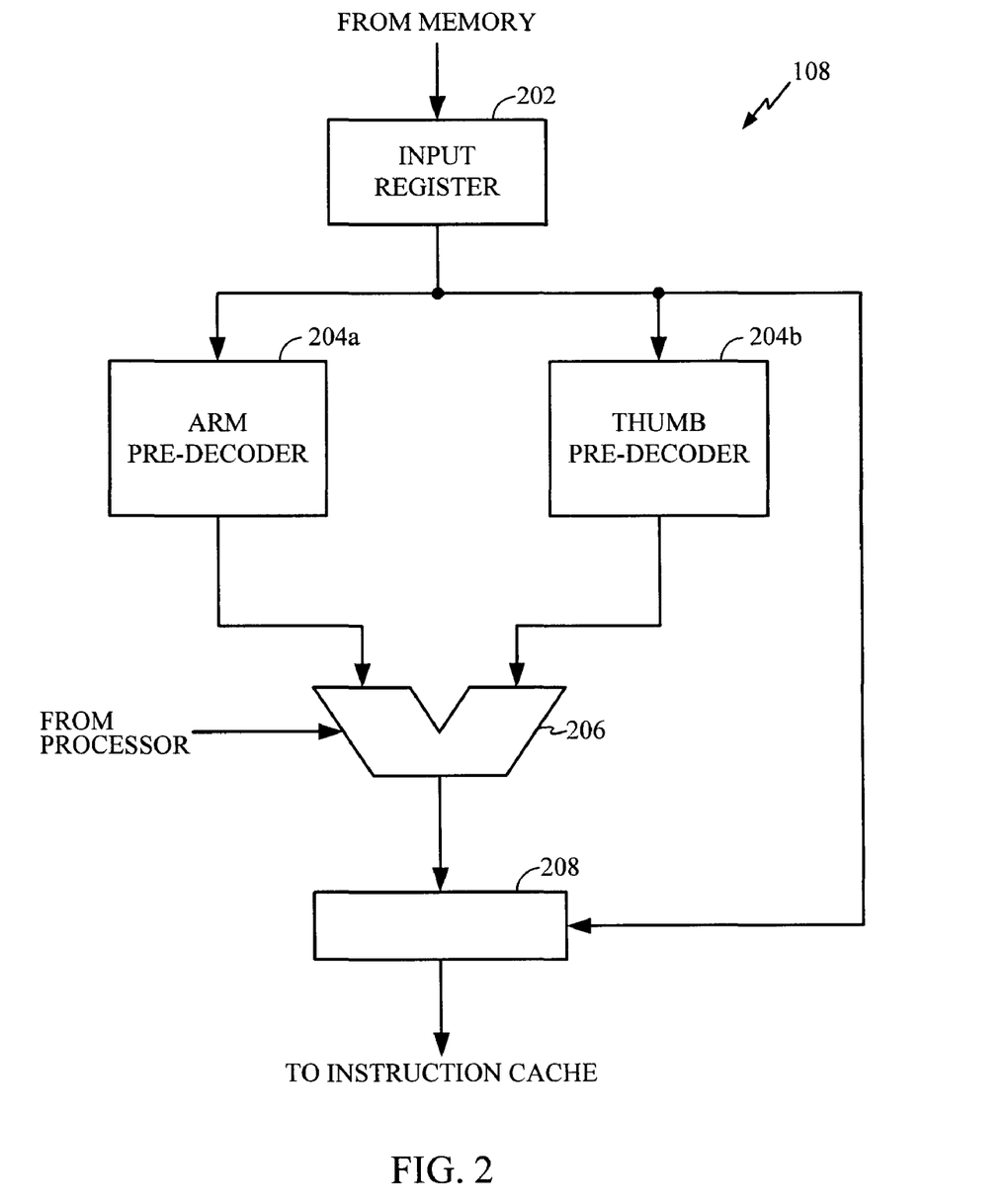
FIG. 2 is a functional block diagram illustrating an example of a pre-decoder.

FIG. 2 is a functional block diagram illustrating an example of a pre-decoder. The pre-decoder 108 includes an input register 202 for receiving the instructions in the cache line from the memory 104 (see FIG. 1). In the case of a multiple state processor, two pre-decoders may be used, one for each processor state 204a, 204b. The instructions in the input register 202 may be provided to the pre-decoders 204a, 204b to produce pre-decode information for each instruction. A multiplexer 206 may be used to select the appropriate pre-decoding information based on signaling from the processor 102 (see FIG. 1). In some embodiments of the pre-decoder 108, the input to the pre-decoders 204a, 204b may be gated to conserve power by enabling only the pre-decoder selected by the processor 102. Each instruction from the register 202 along with its corresponding pre-decode information from the multiplexer 206 may be placed in an output register 208. The contents of the output register may be read into both the processor 102 and the instruction cache 106 (see FIG. 1).

Figure 3A:
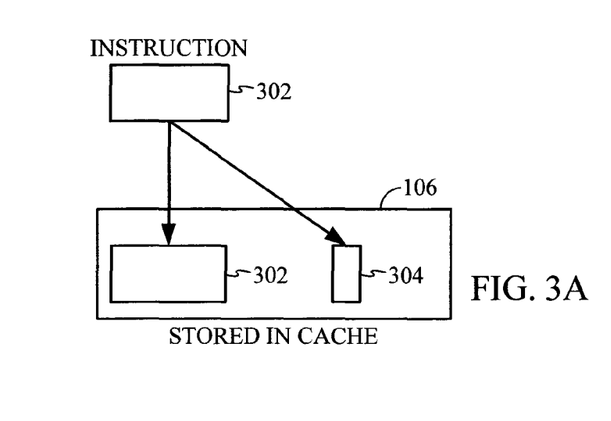
FIG. 3A is a diagram illustrating the data structure of an instruction in cache.
Figure 3B:
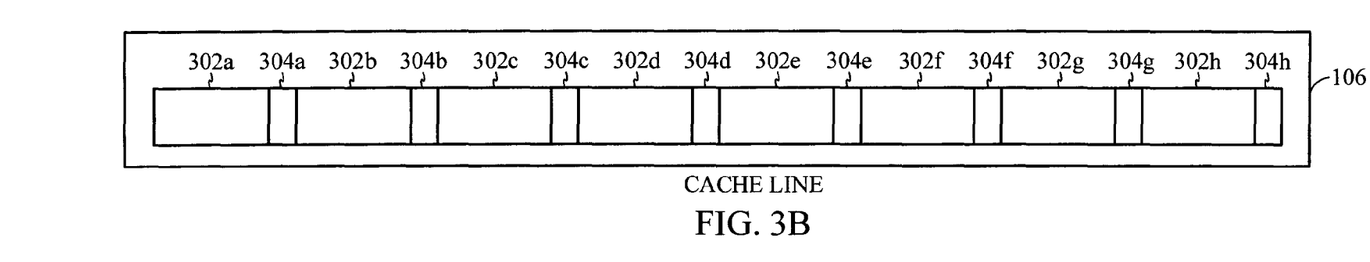
FIG. 3B is a diagram illustrating the data structure of a cache line.

FIG. 3A illustrates how a single instruction 302 is stored with its pre-decode information 304 in the instruction cache 106. FIG. 3B illustrates how an entire cache line consisting of eight instructions is stored in the instruction cache 106. In this example, each instruction 302a-302h has its pre-decode information 304a-304h tacked onto the end. The pre-decoding information may be any number of bits depending on the specific application and the overall design constraints. Moreover, the use of eight instructions to illustrate a cache line is provided as an example only with the understanding that each cache line may hold any number of instructions.

The instruction cache 106 maintains a cache directory (not shown). The cache directory contains one entry or "tag" for each cache line. A one-to-one mapping exists between a cache directory tag and its associated cache line in the cache storage array. The cache directory tag contains the memory address for the first instruction in the cache line. The processor 102 (see FIG. 1) fetches an instruction by searching the cache directory for a tag having the memory address. A match signals a cache hit. The cache directory tag that matches dictates which cache line contains the required instruction. The processor may then access the instruction and its pre-decode information. If the processor is unable to find a match (i.e., a cache miss), it will attempt to read a cache line from the memory 104 (see FIG. 1). The cache line retrieved from the memory is pre-decoded and placed into the instruction cache 106. One or more instructions may also be loaded directly into the processor 102 for immediate decoding and execution. The cache directory is updated so that processor 102 can determine where the cache line resides in the cache storage array on future accesses.

In the processing system of FIG. 1, where a multiple-state processor 102 is employed, multiple instruction sets may reside in the memory 104. In these multiple-state processing environments, a cache line retrieved from the memory 104 may include instruction for multiple states of the processor. Yet, each instruction in the cache line will be pre-decoded based on the current state of the processor 102, and the entire cache line is predecoded at once. If, for example, the processor 102 is operating in a particular state when retrieving a cache line from the memory 104, all instructions contained in the cache line will be pre-decoded as if they are instructions for that state before being placed into the instruction cache 106. A subsequent access to the instruction cache 106 when the processor 102 is in a different state cannot be properly executed because of the pre-decoding.

Figure 3C:
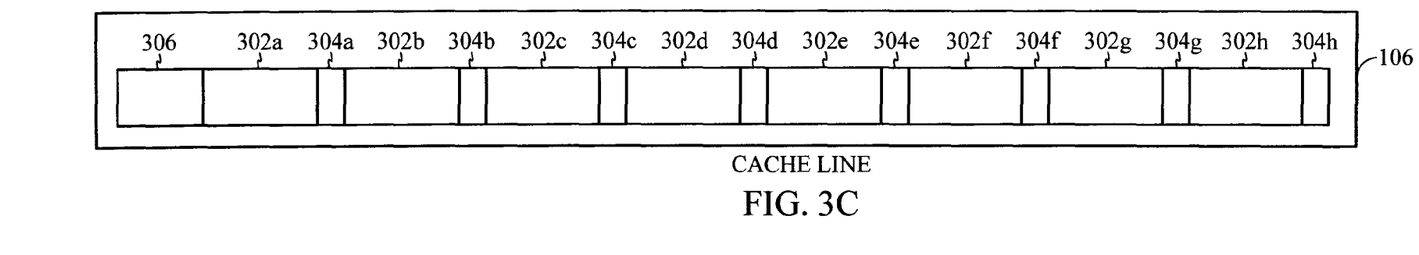
FIG. 3C is a diagram illustrating the data structure of a cache line with state information.

Several techniques may be employed by the processing system 100 to ensure that each instruction retrieved from the instruction cache 106 is not executed by the processor 102 with incorrect pre-decode information. One possible solution is to store "state information" with the pre-decoded instruction in each cache line. "State information" is defined as one or more bits that indicate which state the processor 102 was in when the associated cache line was pre-decoded. FIG. 3C illustrates how an entire cache line consisting of eight pre-decoded instructions is stored with state information. Similar to FIG. 3B, each instruction 302a-302h has its pre-decoding information 304a-304h tacked onto the end. However, in addition to what is shown in FIG. 3B, two bits of state information 306 is included at the beginning of the cache line. Two bits of state information provides up to four different operating states. Those skilled in the art will be readily able to determine the number of bits needed to support the requisite number of processor states in other applications.

Figure 4:
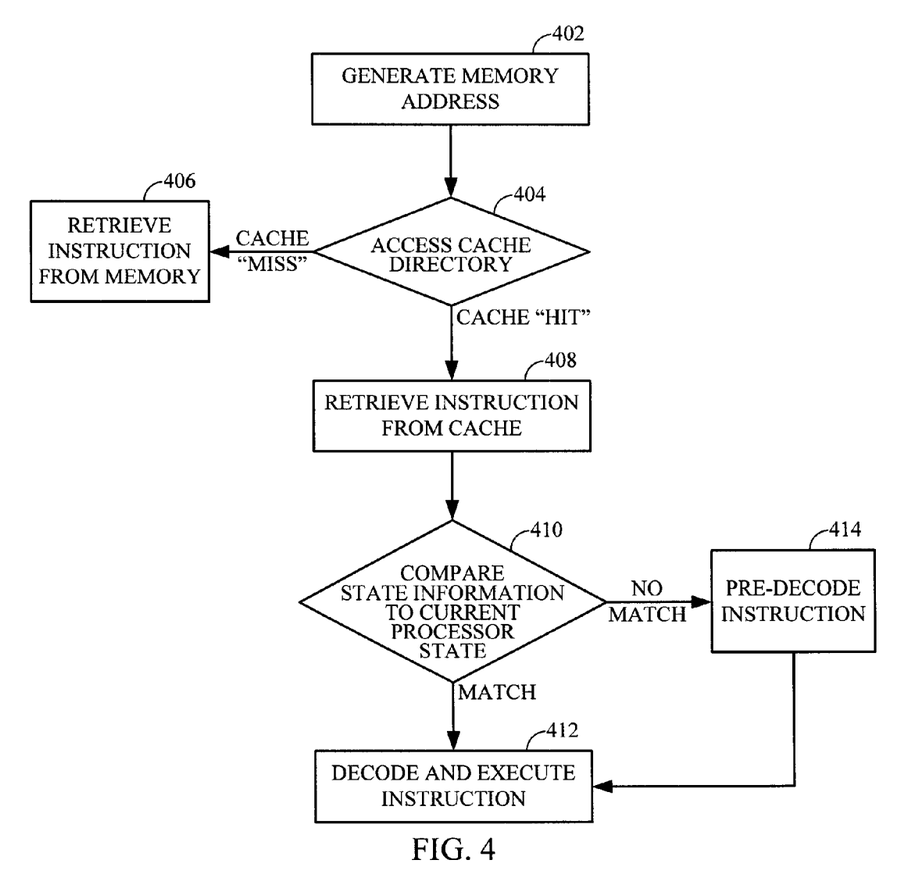
FIG. 4 is a flow diagram illustrating the operation of one embodiment of a multiple-state processor.

FIG. 4 is a flow diagram illustrating the operation of a multiple-state processor using state information with the pre-decoded instruction to determine whether the pre-decoding information for a particular instruction is correct. In step 402, the processor translates a virtual address for a required instruction into a memory address. The processor then searches the tags in the cache directory for the memory address in step 402. The search results in a cache hit or a cache miss. On a cache miss, the processor will attempt to retrieve the instruction from the memory in step 406. On a cache hit, the processor will retrieve the instruction from the instruction cache in step 408, and compare the corresponding state information with the current state of the processor in step 410. If the current state of the processor matches the state information for the instruction, the processor will decode and execute the instruction using the pre-decode information in step 412. Otherwise, the processor will pre-decode the instruction, in step 414, prior to decoding and executing the instruction in step 412.

Figure 5:
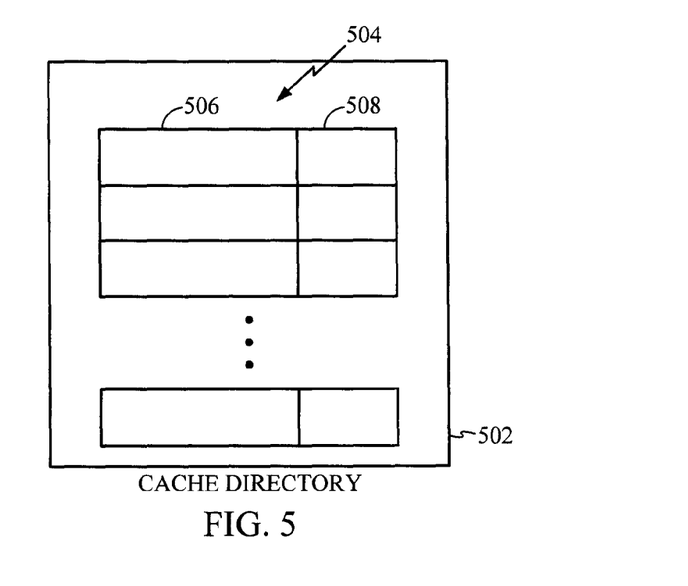
FIG. 5 is a diagram illustrating the data structure of a cache directory tag with state information.

Another possible solution is to include state information in each cache directory tag. FIG. 5 shows how the state information may be added to the tags in the cache directory. The cache directory 502 is shown with a number of tags 504, with each tag corresponding to a cache line in the cache storage array. The cache directory tag 504 contains an address field 506 and a state field 508. The address field 506 includes the memory address for the first instruction in the cache line, and the state field 508 includes state information identifying the state of the processor when the cache line was pre-decoded.

Figure 6:
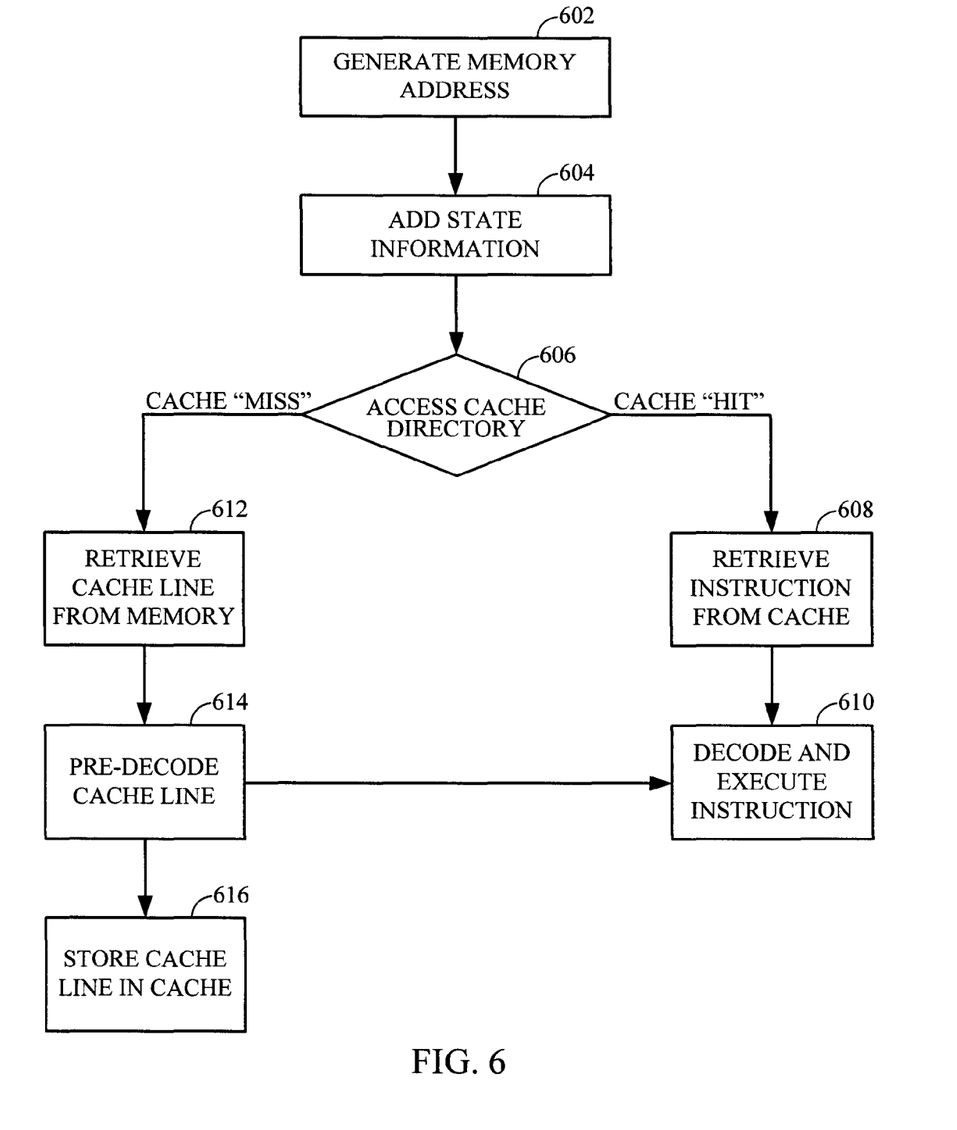
FIG. 6 is a flow diagram illustrating the operation of another embodiment of a multiple-state processor.

FIG. 6 is a flow diagram illustrating the operation of a multiple-state processor using state information in the cache directory tag to determine whether the pre-decoding information of a particular instruction is correct. In step 602, the processor performs the required calculations to generate an address with which to perform a cache lookup. In step 604, the processor adds state information to the memory address corresponding to the current state of the processor. The memory address in combination with the state information form a tag. The tag formed by the processor is then compared to the tags in the cache directory in step 606. In this case, a cache hit means not only that the instruction required by the processor is in the instruction cache, but that the pre-decoded instruction can be executed by the processor in its current state. On a cache hit, the processor retrieves the instruction in step 608, and decodes and executes the instruction using the pre-decoding information in step 610. On a cache miss, the processor retrieves the cache line with the required instruction from the memory in step 612, initiates a pre-decode of the cache line in step 614, and uses the pre-decode information to decode and execute the instruction in step 610. In step 616, the processor stores the pre-decoded cache line into the instruction cache and updates its tag with the address and state information. The result is that multiple copies of a block of memory may exist in the instruction cache at different cache lines. The instructions residing in each of these copies are pre-decoded in different states, and a single lookup in the cache will never return multiple cache hits.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. ARM and THUMB are registered trademarks of ARM Limited. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of operating a processor operates in a plurality of states, the processor operating only in one state at a time, the method comprising:
   retrieving a first copy of a block of instructions from memory while the processor is operating in an initial state;
   pre-decoding via a first pre-decoder the first copy of the block of instructions in accordance with the initial state of the processor, producing first pre-decoded instructions;
   loading the first pre-decoded instructions into a cache;
   loading state information associated with the first pre-decoded instructions into the cache, the state information indicating that the first pre-decoded instructions were pre-decoded in accordance with the initial state of the processor;
   when one pre-decoded instruction of the first pre-decoded instructions in the cache is requested by the processor, determining whether a current state of the processor is the same state of the processor as the initial state of the processor by comparing the current state of the processor to the state information loaded in the cache;
   retrieving the one pre-decoded instruction from the cache;
   pre-decoding the one pre-decoded instruction via a second pre-decoder in accordance with the current state of the processor when the current state of the processor is different from the initial state of the processor; and
   executing the one pre-decoded instruction.

2. The method of claim 1, further comprising executing the one pre-decoded instruction when the comparison between the current state of the processor and the state information in the cache indicates that the current state of the processor is the initial state of the processor.

3. The method of claim 1, wherein the cache includes a first tag associated with the first pre-decoded instructions, wherein the first tag is used by the processor to determine whether the one pre-decoded instruction requested by the processor is in the cache, the method further comprising adding the state information to the first tag.

4. The method of claim 1, further comprising retrieving the one pre-decoded instruction from the cache when the comparison indicates that the current state of the processor is the initial state.

5. The method of claim 1, further comprising retrieving a second copy of the block of instructions from the memory when the comparison indicates that the current state of the processor is different from the initial state.

6. The method of claim 5, further comprising pre-decoding each instruction of the second copy of the block of instructions in accordance with the current state of the processor to produce second pre-decoded instructions, and loading the second pre-decoded instructions into the cache.

7. The method of claim 6, further comprising associating a second tag with the second pre-decoded instructions, and adding second state information to the second tag indicating that the second pre-decoded instructions were pre-decoded in accordance with the current state of the processor.

8. A processing system comprising:
   a memory;
   a cache;
   a processor operating in only one state of a plurality of states at a time, the processor to retrieve a first copy of a block of instructions from the memory while operating in an initial state;
   a first pre-decoder to pre-decode each instruction of the first copy of the block of instructions in accordance with the initial state of the processor to produce first pre-decoded instructions;
   wherein the processor further loads the first pre-decoded instructions into the cache;
   wherein the processor further loads state information associated with the first pre-decoded instructions into the cache, the state information indicating that each instruction of the first pre-decoded instructions was pre-decoded in accordance with the initial state of the processor;
   wherein when one pre-decoded instruction of the first pre-decoded instructions in the cache is requested by the processor, the processor determines whether a state of the processor is the initial state, wherein the determination is made by comparing the state of the processor to the state information in the cache; and
   wherein when the state of the processor is different than the initial state of the processor, the processor retrieves the one pre-decoded instruction from the cache and to pre-decode the one pre-decoded instruction via a second pre-decoder in accordance with the state of the processor before executing the one pre-decoded instruction.

9. The processing system of claim 8, wherein the processor is further configured to retrieve the one pre-decoded instruction from the cache and to decode and execute the one pre-decoded instruction when the comparison between the state of the processor and the state information in the cache indicates that the state of the processor is the same as the initial state of the processor.

10. The processing system of claim 8, wherein the cache includes a tag associated with the first pre-decoded instructions, wherein the processor uses the tag to determine whether the one pre-decoded instruction requested by the processor is in the cache, and wherein the processor is further configured to add the state information to the tag.

11. The processing system of claim 10, wherein the processor is further configured to make the determination by evaluating the tag.

12. The processing system of claim 11, wherein the processor is further configured to retrieve the one pre-decoded instruction from the cache when the tag indicates that the state of the processor is the initial state of the processor.

13. The processing system of claim 11, wherein the processor is further configured to retrieve a second copy of the block of instructions from the memory when the tag indicates that the state of the processor is different than the initial state of the processor.

14. The processing system of claim 13, wherein the pre-decoder is further configured to pre-decode each instruction within the second copy of the block of instructions in accordance with the state of the processor to produce second pre-decoded instructions, and wherein the processor is further configured to load the second pre-decoded instructions into the cache.

15. The processing system of claim 14, wherein the cache is further configured to associate a second tag with the second pre-decoded instructions, and wherein the processor is further configured to add second state information to the second tag, the second state information indicating that the second pre-decoded instructions were pre-decoded in accordance with the state of the processor.

16. A processing system comprising:
  a memory;
  a cache;
  a processor operating in different states, the processor operating only in one state at a time, wherein the processor retrieves a block of instructions from the memory while operating in an initial state, wherein the block of instructions includes instructions from at least two different instruction sets, and wherein the processor further determines whether the processor is operating in a state that is different from the initial state of the processor;
  a first pre-decoder to pre-decode the block of instructions when the processor is operating in the initial state, and to store the pre-decoded block of instructions together with associated state information in the cache, wherein the state information indicates that each instruction of the first pre-decoded block of instructions was pre-decoded in accordance with the initial state of the processor; and
  a second pre-decoder to pre-decode a requested pre-decoded instruction from the pre-decoded block of instructions stored in the cache when the processor is operating in the state that is different than the initial state, wherein the determination is made by comparing the state of the processor to state information loaded in the cache.

17. The processing system of claim 16, wherein the different states of the processor include a Thumb-2 Execution Environment (T2EE) state.

18. The processing system of claim 8, wherein the processor is further configured to execute the one pre-decoded instruction in the cache when the processor determines that the current state of the processor is the same as the initial state of the processor.

19. The processing system of claim 8, wherein one of the operating states of the processor is a Thumb-2 Execution Environment (T2EE) state.

20. The processing system of claim 8, wherein the processor is further configured to decode the one instruction prior to executing the one pre-decoded instruction.

21. The processing system of claim 1, wherein one of the states of the processor is a Thumb-2 Execution Environment (T2EE) state.

22. The method of claim 1, wherein the state information is stored in two data bits located at a beginning of a cache line.

23. The method of claim 1, further comprising decoding the one pre-decoded instruction prior to executing the one pre-decoded instruction.

* * * * *